(12) United States Patent
Lesso

(10) Patent No.: US 11,271,756 B2
(45) Date of Patent: Mar. 8, 2022

(54) AUDIO DATA TRANSFER

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 108 days.

(21) Appl. No.: 16/607,539

(22) PCT Filed: Apr. 27, 2018

(86) PCT No.: PCT/GB2018/051137
§ 371 (c)(1),
(2) Date: Oct. 23, 2019

(87) PCT Pub. No.: WO2018/197901
PCT Pub. Date: Nov. 1, 2018

(65) Prior Publication Data
US 2020/0076621 A1    Mar. 5, 2020

Related U.S. Application Data

(60) Provisional application No. 62/491,508, filed on Apr. 28, 2017.

(30) Foreign Application Priority Data

Jul. 11, 2017  (GB) ...................... 1711161

(51) Int. Cl.
*H04L 9/32*          (2006.01)
*G06F 21/33*         (2013.01)
(Continued)

(52) U.S. Cl.
CPC ............ *H04L 9/3268* (2013.01); *G06F 21/32* (2013.01); *G06F 21/33* (2013.01); *G10L 17/00* (2013.01);
(Continued)

(58) Field of Classification Search
CPC ..... H04L 9/3268; H04L 9/3242; G10L 17/00; G10L 17/06; G10L 19/00; G06F 21/32;
(Continued)

(56) References Cited

U.S. PATENT DOCUMENTS

2011/0038594 A1* 2/2011 Symons ............. G11B 20/0021
                                                386/224
2012/0317420 A1* 12/2012 Matsuo .................... H04N 7/18
                                                713/176
(Continued)

FOREIGN PATENT DOCUMENTS

| EP | 2541830 A1 | 1/2013 |
|----|------------|--------|
| GB | 2541466 A  | 2/2017 |
| WO | 2017074564 A1 | 5/2017 |

OTHER PUBLICATIONS

Combined Search and Examination Report under Sections 17 and 18(3), UKIPO, Application No. GB1711161.8, dated Sep. 10, 2019.

(Continued)

*Primary Examiner* — Nelson S. Giddins
(74) *Attorney, Agent, or Firm* — Jackson Walker L.L.P.

(57) ABSTRACT

This application relates to the transfer of audio data, and in particular to the verification that data transmitted to a data processing module, such as voice biometric module (111), did originate from a microphone. A microphone authentication apparatus (204) is described having a first input for receiving analogue audio signals from a microphone transducer (201) and an analogue-to-digital converter (202) coupled to said first input for generating digital microphone data based on the received audio signals. A data authentication module (203) generates an authentication certificate (MAC) for certifying that the digital microphone data did pass via the authentication module. The authentication certificate is based on the digital microphone data (DM) and an authentication module key. An output module outputs a (Continued)

digital microphone audio signal based on the digital microphone data with the authentication certificate.

18 Claims, 3 Drawing Sheets

(51) Int. Cl.
    *G06F 21/32* (2013.01)
    *G10L 17/06* (2013.01)
    *G10L 19/00* (2013.01)
    *G10L 17/00* (2013.01)

(52) U.S. Cl.
    CPC .............. *G10L 17/06* (2013.01); *G10L 19/00* (2013.01); *H04L 9/3242* (2013.01)

(58) Field of Classification Search
    CPC .......... G06F 21/33; G06F 21/44; G06F 21/57; G06F 21/83
    See application file for complete search history.

(56) References Cited

U.S. PATENT DOCUMENTS

| | | | | |
|---|---|---|---|---|
| 2013/0246800 | A1* | 9/2013 | Stewart | G06F 21/85 713/176 |
| 2015/0143118 | A1* | 5/2015 | Sheller | H04L 63/0428 713/168 |
| 2015/0178487 | A1 | 6/2015 | Hu et al. | |
| 2016/0094338 | A1 | 3/2016 | Pappachan et al. | |
| 2017/0006389 | A1* | 1/2017 | Pedersen | H04R 25/554 |
| 2017/0093852 | A1 | 3/2017 | Khosravi et al. | |
| 2017/0110144 | A1 | 4/2017 | Sharifi et al. | |

OTHER PUBLICATIONS

International Search Report and Written Opinion of the International Searching Authority, International Application No. PCT/GB2018/051920, dated Sep. 19, 2018.
International Search Report and Written Opinion of the International Searching Authority, International Application No. PCT/GB2018/051137, dated Jun. 18, 2018.
Combined Search and Examination Report under Sections 17 and 18(3), UKIPO, Application No. GB1711161.8, dated Jan. 8, 2018.
Combined Search and Examination Report under Sections 17 and 18(3), UKIPO, Application No. GB1712054.4, dated Jan. 16, 2018.
Combined Search and Examination Report under Sections 17 and 18(3), UKIPO, Application No. GB1718648.7, dated Apr. 18, 2018.
International Search Report and Written Opinion of the International Searching Authority, International Application No. PCT/GB2018/051137, dated Jun. 18, 2019.
Examination Report under Section 18(3), UKIPO, Application No. GB1919025.5, dated Jul. 29, 2021.

* cited by examiner

AUDIO DATA TRANSFER

The present application is a 371 of International Patent Application No. PCT/GB2018/051137, filed Apr. 27, 2018, which claims priority to U.S. Provisional Patent Application Ser. No. 62/491,508, filed Apr. 28, 2017, and United Kingdom Patent Application Serial No. 1711161.8, filed Jun. 11, 2017, each of which is incorporated by reference herein in its entirety.

The field of representative embodiments of this disclosure relates to methods, apparatus and/or implementations concerning or relating to audio data transfer and especially to transfer of audio data between a microphone and a component for processing the audio data in a secure manner.

It is increasingly being proposed to provide electronic devices with voice user interfaces to allow a user to interact with a system using their voice.

One advantage of this interface, for example in devices such as smartphones, tablet computers and the like, is that it may allow the user to operate at least some aspects of the device in a hands-free manner. Speech recognition techniques, i.e. techniques to extract the words spoken from the voice audio signal, may, for example, be used to detect that a particular trigger phrase has been spoken to set the device to expect a spoken command and to recognize a command when spoken and to perform operations in response. For example, if the spoken command asks for publicly available information, then the interface may cause a query to be submitted to an internet search engine in order to be able to supply that information to the user.

In some cases, some level of authentication may be desirable to verify the identity of the user before acting on a command, whether spoken or not, for example if the command relates to personal information, or requests some financial transaction.

It is expected that biometric based authentication will replace passwords, particularly on mobile platforms, as long passwords are difficult to remember and difficult to type on such devices. Voice based biometric authentication may be one convenient authentication technique, especially where the device has a voice control interface as it allows a user to maintain a generally hands-free mode of user interaction.

The voice user interface may thus comprise some form of biometric speaker recognition, i.e. some analysis of the voice audio input signal to extract characteristics of that signal distinctive to one of one or more users. Speaker recognition may allow the identity of the user to be verified with a high level of confidence with more security than passwords and more conveniently than other biometric verification methods, such as fingerprint or iris patterns, and used to allow operations, such as financial transactions, although multiple different types of authentication (e.g. passwords, fingerprint/iris/voice recognition, etc.) may be combined in order to increase the security of a particular operation.

While the use of biometrics in general increases the security of a particular operation, by ensuring the person requesting that the operation be carried out is a registered user of that device, biometric solutions are not invulnerable to attacks from third parties. For example, a fingerprint of a particular user may be stolen (e.g. "lifted" from an object the user has touched) by a third party intent on using that fingerprint to access the user's device. A user's voice may be recorded by a third party and played back to the device in order to bypass voice biometric security. A picture of the user's iris may be acquired and used to bypass iris recognition software.

All of these techniques require significant effort on the part of the third party attempting to gain access to the user's device. Further, even if successful, the techniques allow that third party access to just a single device at a time. A more modern technique for bypassing biometric security systems, requiring fewer resources and scalable to multiple devices at a time, may involve the surreptitious installation of malware on the user's device. For example, such malware may be able to bypass or otherwise prevent security processes from functioning effectively, and thus allow the third-party attacker access to the devices on which it is installed.

Embodiments of the present disclosure relate to methods and apparatus that may help defend voice based biometric authentication systems.

Thus according to the present invention there is provided a microphone authentication apparatus comprising:
  a first input for receiving analogue audio signals from a microphone transducer;
  an analogue-to-digital converter coupled to said first input for generating digital microphone data based on the received audio signals;
  a data authentication module for generating an authentication certificate for certifying that the digital microphone data did pass via the authentication module, wherein the data authentication module generates the authentication certificate based on the digital microphone data and an authentication module key; and
  an output module for outputting a digital microphone audio signal based on the digital microphone data with the authentication certificate.

The apparatus may include a microphone transducer coupled to the first input for generating the analogue audio signals. The microphone transducer, analogue-to-digital converter and data authentication module may be formed within a digital microphone package. The microphone transducer, analogue-to-digital converter and data authentication module may be formed as an integrated circuit. The microphone transducer may be a MEMS microphone transducer.

In some embodiments the analogue-to-digital converter and data authentication module may be formed in an integrated audio circuit and the first input may comprise a connector of the integrated circuit for receiving audio signals from an off-circuit microphone transducer. The audio circuit may be an audio codec. The audio circuit may be configured to receive the analogue audio signals at the first input from a microphone transducer which is part of a host device in which the audio circuit is housed. Additionally or alternatively the audio circuit may be configured to receive analogue audio signals at the first input from a microphone transducer external to a host device in which the audio circuit is housed via a connector of the host device.

The data authentication module may comprise a hash module for performing a hash algorithm on the digital microphone data and a signing module for signing a hash value derived from the hash algorithm using the authentication module key. The data authentication module may be configured to derive an initial hash value from the hash algorithm and to pad the initial hash value to generate a padded hash value. The signing module may sign the padded hash value. In some instance the signing modules may sign the hash value using an RSA algorithm and/or an Elliptic-curve-cryptograph algorithm.

The output module may comprise a data encoder for encoding the digital microphone data in the digital microphone audio signal with the authentication certificate. The encoder may output the authentication certificate in a predefined bit arrangement with respect to the digital audio data or via a side channel or data transport mechanism of a digital data transfer protocol.

In some examples a first signal processing module may apply a first function to the digital microphone data and the data authentication module may be configured to generate the authentication certificate based on the digital microphone data having been processed by the first signal processing module. In some instance there may further be a second signal processing module for applying a second function to the digital microphone data, and the data authentication module may be configured to generate the authentication certificate based on the digital microphone data having been processed by both the second signal processing module and the first signal processing module. The output module may output the digital microphone audio signal based on the digital microphone data processed by the second signal processing module. The second function may be a compression function and/or the first function may be a decompression function.

Examples also relate to an audio system having a microphone authentication apparatus as described in any of the variants above and a first data processing module for receiving input digital data, wherein said first data processing module may be configured to receive a digital microphone audio signal. The first data processing module may comprise a data verification module for verifying whether the digital microphone audio signal comprises digital audio data with an accompanying authentication certificate that indicates that the received digital microphone data was authenticated by the data authentication module.

The first data processing module may be a voice biometric user authentication module for verifying whether the received digital microphone data corresponds to the voice of a registered user. The voice biometric user authentication module may be configured to not verify the received digital microphone data as corresponding to the voice of a registered user if the received digital microphone data is not verified as having been authenticated by said data authentication module.

The data verification module may be configured to verify whether an authentication certificate accompanying digital audio data is valid using a verification module key corresponding to the authentication module key. In some implementations the system may be configured to update the authentication module key and corresponding verification module key over time. The audio system may be configured to update the authentication module key and corresponding verification module key in response to at least one of: a defined number of one or more authentications of data, e.g. by the data verification module; one or more instances of a voice trigger command being detected; and/or a key change command generated at periodic intervals.

The data verification module may comprise a hash module for performing a hash algorithm on the received digital microphone data; a cryptographic module for processing a received authentication certificate using a verification module key; and a comparator for comparing a hash value derived from the hash algorithm with a signed hash value derived from the cryptographic module. The data verification module may be configured to derive an initial hash value from the hash algorithm and to pad said initial hash value to generate a padded hash value. The comparator may compare the signed hash value with the padded hash value. The cryptographic module may process the authentication certificate using an RSA algorithm and/or an Elliptic-curve-cryptograph algorithm.

In some examples of an audio, a data decoder may receive the input digital microphone audio signal and separately output the received digital audio data and the authentication certificate.

In some instances there may be a plurality of authentication modules, each authentication module associated with at least one microphone. The verification module may be configured to identify which of the plurality of authentication modules authenticated the received digital microphone data. In some instances a controller may be configured to select one of a plurality of signal processing settings for controlling signal processing to be applied to the received digital microphone data based on the identity of which of the plurality of authentication modules authenticated the received digital microphone data.

In some examples of an audio system where the authentication apparatus has the first and optionally the second signal processing modules discussed above, the first data processing module may comprise a third signal processing module configured to apply the first function to the received digital microphone data and the data verification module may receive data output from the third signal processing module.

Also provided is an electronic device having a microphone authentication apparatus or an audio system as described in any of the variants above. The electronic device may be at least one of: a portable device; a battery powered device; a communication device; a mobile or cellular telephone; a smartphone; a computing device; a notebook, laptop or tablet computer; a voice activated device.

Also provided is a method of authenticating microphone audio data comprising:
  receiving audio signals from a microphone transducer and generating digital microphone data based on the received audio signals;
  generating, within a trusted domain, an authentication certificate for certifying that the digital microphone data did pass via the trusted domain; and
  outputting a digital microphone audio signal based on the digital microphone data with the authentication certificate.

The method may be performed by components within a packaged microphone apparatus.

Also provided is an audio data verification apparatus comprising:
  a first processing module for receiving input digital data, wherein said processing module may be configured to receive digital microphone audio data;
  wherein said processing module comprises a verification module for verifying whether digital audio data is received with an accompanying authentication certificate that indicates that the received digital audio data was authenticated by an authentication module.

Also provided is a digital microphone comprising:
  a microphone transducer;
  an analogue-to-digital converter for generating digital microphone audio data based on the received audio signals;
  an authentication module for generating an authentication certificate for certifying that the digital microphone audio data did pass via the authentication module; and
  an output for outputting the digital microphone audio signal with the authentication certificate.

Also provided is an electronic device comprising:
  a microphone;

a voice biometric authentication module for verifying whether or not a user is a registered user by analysing voice audio data; and an authentication module in a signal path between the microphone and the voice biometric authentication module for generating an authentication certificate for audio data received from the microphone.

Also provided is an electronic device comprising:

a trusted domain for receiving or generating digital audio data corresponding to sounds detected by a microphone transducer; and an authentication module within the trusted domain for authenticating the audio data such that a processing module can verify whether audio data received was authenticated within the trusted domain.

Also provided is a microphone authentication apparatus comprising:

a first input for receiving audio signals from a microphone transducer;

an analogue-to-digital converter coupled to said first input for generating digital microphone data based on the received audio signals;

a data authentication module for generating an authentication certificate for certifying that the digital microphone data did pass via the authentication module; and the apparatus being configured to output a digital microphone audio signal based on the digital microphone audio data with the authentication certificate.

For a better understanding of examples of the present disclosure, and to show more clearly how the examples may be carried into effect, reference will now be made, by way of example only, to the following drawings in which.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for transfer, with data authentication, of audio data received from a microphone. The authentication allows a processing module receiving audio data to verify that the audio data was validly received from the microphone. The processing module may be one which is itself used for authenticating the identity of a user, for instance a voice based biometric authentication module.

Figure 1:
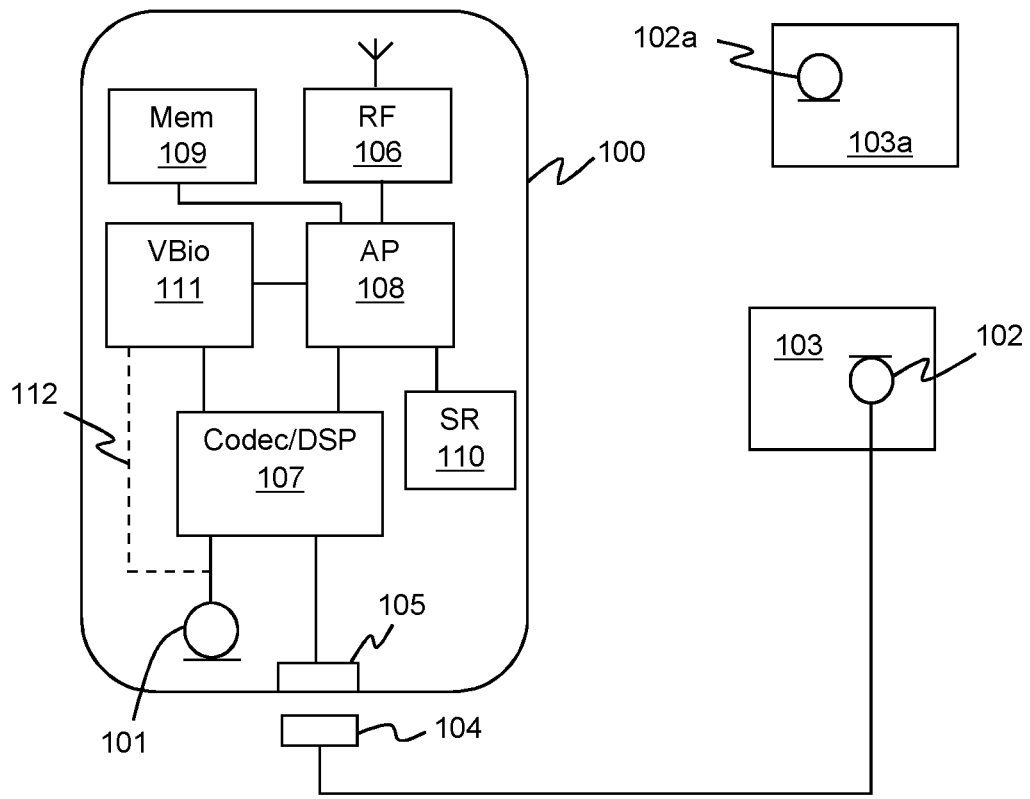
FIG. 1 illustrates an electronic device having a voice authentication module.

FIG. 1 illustrates one example of an electronic device 100, such as a mobile telephone or tablet computer for example. The electronic device 100 may comprise at least one microphone 101 for providing audio signals corresponding to detected sounds. A microphone 101 of the electronic device 100 may provide an analogue microphone audio signal but in some embodiments the microphone 101 may be a digital microphone that outputs a digital microphone audio signal.

Additionally or alternatively the device 100 may be operable, in use, to receive audio signals from at least one external microphone of an accessory apparatus. An accessory apparatus 103 may, in some instances, be removably physically connected to the electronic device 100 for audio data transfer, for instance by a connector 104 of the accessory apparatus making a mating connection with a suitable connector 105 of the electronic device. Audio data received from the accessory apparatus may be analogue or may, in some instances, comprise digital audio data.

In some instances an accessory apparatus 103a may be configured for local wireless transfer of audio data from a microphone 102a of the accessory apparatus 103a to the electronic device 100, for instance via a wireless module 106 of the electronic device 100. Such wireless transfer could be via any suitable wireless protocol such as WiFi or Bluetooth™ for example.

Audio data from an on-board microphone 101 of the electronic device 100 and/or audio data from a microphone 102/102a of the accessory apparatus 103/103a may be processed in a variety of different ways depending on the operating mode or use case of the electronic device 100 at the time. Received digital microphone data may be processed by audio processing circuitry 107 which may, for instance comprise an audio codec and/or a digital signal processor (DSP) for performing one or more audio processing functions, for instance to apply gain and/or filtering to the signals, for example for noise reduction.

A control processor 108 of the electronic device, often referred to as an applications processor (AP), may control at least some aspects of operation of the electronic device and may determine any further processing and/or routing of the received audio data. For instance for telephone communications the received audio data may be forwarded to the wireless module 106 for broadcast. For audio or video recording the data may be forwarded for storage in a memory 109. For voice control of the electronic device 100 the audio data may be forwarded to a speech recognition module 110 to distinguish voice command keywords.

The device 100 may also comprise a voice biometric authentication module 111 for analysing audio data received from microphone 101 and/or 102 and determining whether the audio data corresponds to the voice of a registered user, i.e. for performing speaker recognition.

The voice biometric authentication module 111 receives input audio data, e.g. from the microphone 101, and compares characteristics of the received audio data with user-specific reference templates specific to a respective pre-registered authorized user (and maybe, for comparison, also with reference templates representative of a general population). Voice/speaker recognition techniques and algorithms are well known to those skilled in the art and the present disclosure is not limited to any particular voice recognition technique or algorithm.

The voice biometric authentication module 111 may be activated according to a control input conveying a request for voice biometric authentication, for example from the AP 108. For example, a particular use case running on the AP 108 may require authentication to wake the device 100, or to authorize some command, e.g. a financial transaction. If the received audio data corresponds to an authorized user, the voice biometric authentication module 111 may indicate this positive authentication result, for example by a signal BioOK which is sent to the AP 108. The AP 108 (or a remote server that has requested the authentication) may then act on the signal as appropriate, for example, by authorizing some activity that required the authentication, e.g. a financial transaction. If the authentication result were negative, the activity, e.g. financial transaction, would not be authorised.

In some embodiments the voice biometric authentication module 111 may be enabled by a voice activity event detected, for example, by the codec/DSP 107 or another dedicated module (not shown). For example, when the device 100 is in a low-power sleep mode, any voice activity may be detected and a signal VAD (voice activity detected) communicated to the biometric authentication module 111. In the event of a positive user authentication, the signal BioOK may be used by the AP 108 to alter the state of the device 100 from the low-power sleep mode to an active mode (i.e. higher power). If the authentication result were negative, the mode change may not be activated.

In some embodiments there may be a signal path 112 for providing audio data directly from a microphone 101 to the voice biometric authentication module 111 for the purposes of voice authentication. However in at least some embodiments and/or for some use cases audio data from microphone 101 of the electronic device 100 or from a microphone 102 of an accessory apparatus 103 may be provided to the voice biometric authentication module 111 via the AP 108 and/or via codec/DSP 107 or via a path including some other processing modules.

Whilst voice biometric authentication module 111 has been illustrated as a separate module in FIG. 1 for ease of reference it will be understood that the voice biometric authentication module 111 could be implemented as part of or integrated with one or more of the other modules/processors described, for example with speech recognition module 110. In some embodiments the voice biometric authentication module 111 may be a module at least partly implemented by the AP 108 which may be activated by other processes running on the AP 108. In other embodiments the voice biometric authentication module 111 may be separate to the AP 108 and in some instances may be integrated with at least some of the functions of the codec/DSP 107.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. A module may itself comprise other modules or functional units.

The AP 108 may typically be capable of running many different applications or software processes and may be configured so that software processes can be installed from outside sources by a user directly into the processor 108 and associated memory 109, for instance via connector 105 or via the wireless module 106 for example. This provides a route for malicious software (malware) to be installed surreptitiously, and for this malware to corrupt the operation of the biometric authentication.

For example it may be possible that malware could be installed to run on an insecure area of the AP 108 and which may attempt to access a service which requires authentication from the voice biometric authentication module 111. The voice biometric authentication module 111 itself may be secure, in that an authentication signal from the voice biometric authentication module 111 cannot be faked and in that the voice biometric authentication module 111 will only generate an authentication signal indicating that authentication is successful if the audio input supplied to the voice biometric authentication module 111 does match the registered user. However it is conceivable that malware could be arranged to generate false audio data and provide said false audio to the voice biometric authentication module 111 as if it were genuine audio data from a user, the false data being selected to have a chance of being falsely recognised as matching the registered user.

For instance it may be possible for an attacker to defeat voice biometric authentication by recording a registered user speaking without their knowledge and using such recording later when attacking a secure service. In practice it may be quite difficult for a third party to use some sort of separate recording device to obtain a good quality recording of a user without that user's knowledge, but if malware were installed on the user's device the malware may be arranged to record the user's voice (using the user's device) without the user being aware.

To guard against such an attack using a recording of a user's voice it is known for some applications that use voice biometric authentication to, in the event that a request to access a secure service is received, generate a prompt to prompt the user to say one or more selected words or phrases. The words or phrases may be selected with a degree of randomness so as to vary each time in an unpredictable way. This requires the user to utter the words or phrases corresponding to the prompt. If the correct prompt is then uttered and the voice corresponds to the relevant user then the authentication result may be positive, otherwise the authentication will fail, i.e. produce a negative authentication result.

If malware has been inadvertently installed in the electronic device 100 then, as the AP 108 controls the codec/DSP 107 and may be configured for recording, it is possible that the malware could be configured to, unknown to the user, record and/or analyse voice data from the user over time. When sufficient data has been recorded and/or analysed the malware may attempt to access the secure service. The secure service may then generate a voice prompt and alert the voice biometric authentication module 111 to perform authentication. The malware may identify the selected voice prompt and then supply an audio signal which is synthesised or formed from the various recordings of the user's voice to correspond to the requested prompt. If this faked audio signal is good enough the voice biometric authentication module 111 will recognise the audio as corresponding to the registered user and also corresponding to the selected voice prompt and falsely generate a positive authentication result.

Embodiments of the present disclosure relate to methods and apparatus that at least mitigate at least some of the above mentioned issues. In particular in some embodiments audio data from a microphone may be authenticated as genuinely having been captured by a microphone, which may be a particular microphone.

In embodiments of the invention digital microphone data corresponding to an audio signal output from a microphone transducer is processed to derive an authentication certificate that can be sent with the digital microphone data. In effect the digital microphone data is signed within a trusted domain, which may in some instances be within the packaged microphone itself, in a way that means that any processing module, such as the voice biometric authentication module 111, can verify that received audio data, the digital microphone data, was indeed generated by the microphone.

Figure 2A:
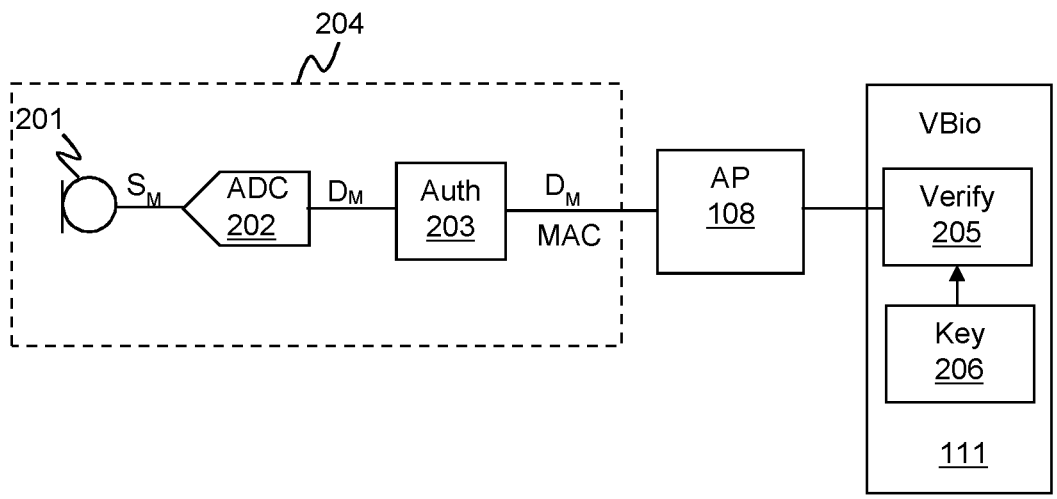
FIGS. 2a and 2b illustrate examples of authenticated transfer of microphone audio data.

FIG. 2a illustrates one example of an embodiment. FIG. 2a illustrates that a microphone transducer 201 may be coupled to an analogue-to-digital converter 202 to provide a digital signal $D_M$ representative of the acoustic audio signal detected by the microphone transducer 201. The digital microphone audio data $D_M$ is passed to a data authentication module 203, which processes the data $D_M$ to generate an authentication certificate for the microphone audio data $D_M$. As used here the term authentication certificate shall be taken to mean some data which is derived from the digital microphone audio data $D_M$ and which can be used to verify that audio data received downstream did pass via the data authentication module 203 and has not been tampered with. By generating an authentication certificate the data authentication module 203 effectively signs and certifies the data as will be described in more detail below. The transducer 201, ADC 202 and data authentication module 203 are all included within a trusted domain 204, in that it can be trusted that operation of the domain 204 with respect to authenticating the microphone audio data $D_M$ cannot be tampered with by the AP 108.

In some embodiments the ADC 202 and data authentication module 203 may be included with the transducer 201 in a microphone package. That is the trusted domain 204 may be part of a digital microphone component. Thus, for example, microphone 101 illustrated in FIG. 1 may be a digital microphone comprising the components within the trusted domain 204 illustrated in FIG. 2a. The microphone transducer 201 may be integrated with the ADC 202 and data authentication module 203 in an integrated circuit. The microphone transducer in some embodiments may be a MEMS microphone transducer.

Some embodiments thus relate to a digital microphone 101 which outputs digital data corresponding to digital microphone audio data and an authentication certificate for the digital microphone audio data. In such embodiments therefore the digital data output from the digital microphone is effectively authenticated at source.

In some embodiments however the data authentication module 203 and possibly the ADC 202 may be formed as part of a trusted domain of an audio circuit, such as a codec, which is distinct from, but arranged for receiving audio data from, the microphone transducer 201, i.e. the microphone transducer is off-circuit and may be packaged separately.

For example ADC 202 and data authentication module 203 may be formed on a codec 107 and connected to receive a signal $S_M$ from an off-chip microphone transducer, which could be an on-board microphone 101 of the electronic device 100 or a microphone 102 of a connected accessory apparatus 103. The connection between the codec 107 and the microphone 101 and/or connector 105 for connecting to a microphone 102 of a connected accessory apparatus 103 may be such that it is can be trusted that the signal $S_M$ received at the codec 107 did originate at the microphone 101 or 102. For example an on-board microphone 101 may be hardwired to a pin of codec 107 in such a way that signals received at that pin must have originated from the relevant on-board microphone. Likewise a pin of codec 107 for receiving microphone signals from a connected accessory apparatus 103 (connected, in use, via connector 105) may only be able to receive signals from the connected accessory and thus such a data path may be expected not to be compromised by malware running on the AP 108.

In such embodiments signals cannot be injected without direct physical access to the individual device or accessory apparatus, possibly even requiring access to internal components or wiring, and thus the analogue audio path may be trusted as being difficult to interfere with. The ADC 202 and data authentication module 203 may be arranged in a trusted domain of the codec 107 that receives the analogue audio signals and arranged to authenticate the digital audio data before it is forwarded elsewhere. In some embodiments the data authentication module 203 may operate directly on the output of the ADC 202 so that the digital microphone data is effectively authenticated as soon as it is converted to digital. However if some signal processing can be implemented within the trusted domain of the codec 107 then at least some signal conditioning, e.g. filtering etc. may be performed on the digital microphone data before authentication.

The data authentication module 203 thus receives digital microphone data $D_M$ which can be trusted as having originated from a relevant microphone. The data authentication module 203 processes this data to generate an authentication certificate, which will be referred to herein as a MAC (message authentication certificate), which can then be sent along with the digital microphone audio data $D_M$. The data authentication module may generate the MAC using a key which is known only to the data authentication module, e.g. a private key.

The MAC may be sent along with the microphone audio data $D_M$ in a variety of ways depending on the format in which the microphone audio data is to be transmitted. The audio data $D_M$ and the MAC be sent via the same interface, for instance as different channels of data according to an appropriate data format or via different data transport mechanisms. For instance, if the microphone audio data is transmitted via a data protocol that has defined frames the MAC could be sent in some predetermined bit arrangement with respect to the digital audio data, i.e. as the first or last so many bits or frames of data or interspersed at predefined bit intervals. If the data protocol allows for multiple channels of data, the MAC could be sent along with the microphone audio data $D_M$ via a suitable side channel. It will be appreciated that the audio data $D_M$ may be isochronous data. The audio data may be transferred to meet a suitable audio data rate. As noted a MAC may be generated for one or more frames, or for a defined period, of the audio data $D_M$. The MAC may therefore be transmitted asynchronously at a data rate which is lower, and possibly significantly lower, than required for the audio data $D_M$. Some data transmission protocols allow for transmission of data via a control channel at a lower data rate than the main data payload. In some instances therefore it may be advantageous to transmit the MAC via an appropriate data transport mechanism, e.g. control channel, of a suitable transmission protocol.

The relevant audio data in the microphone audio data signal $D_M$ may thus be substantially unchanged by the authentication, in that it is still representative of the original acoustic audio signal. It will be appreciated that the audio data itself is not encrypted in this example and the digital microphone audio data may thus be used directly for a number of a different purposes. For purposes where no verification regarding the digital microphone audio data $D_M$ is required the data may be used directly.

This means that no significant latency or processing overhead is necessarily added to use of the microphone data. In some instances the microphone data may be buffered before transmission, whilst generating a MAC for that portion of the microphone audio data $D_M$, so that the MAC can be transmitted contemporaneously with the portion of the microphone audio data to which it relates. For instance transmission of the microphone audio data may be delayed for sufficient time that a MAC can be generated for one or more frames of microphone audio data and sent as part of that frame or group of frames. Such a processing delay or latency will generally be relatively low. In some instances however, especially if a low latency for the audio signal path is desired, the microphone audio data may be transmitted without any significant delay and the relevant MAC transmitted later. The MAC could be transmitted with a predefined timing after transmission of a frame of audio data, and/or together with some identification information, so that a MAC can be synchronised with a previously transmitted frame of microphone audio data by a receiving module.

FIG. 2a illustrates a signal path from trusted domain 204, having a microphone 102 and data authentication module 203, which passes to the voice biometric authentication module 111 via AP 108. It will be understood however that this is just one implementation and there are a number of different ways in which authentication could be implemented, for instance there could be separate paths from the trusted domain 204 to the AP 108 and voice biometric authentication module 111 and/or the audio data could pass to the AP via the voice biometric authentication module 111.

Figure 2B:
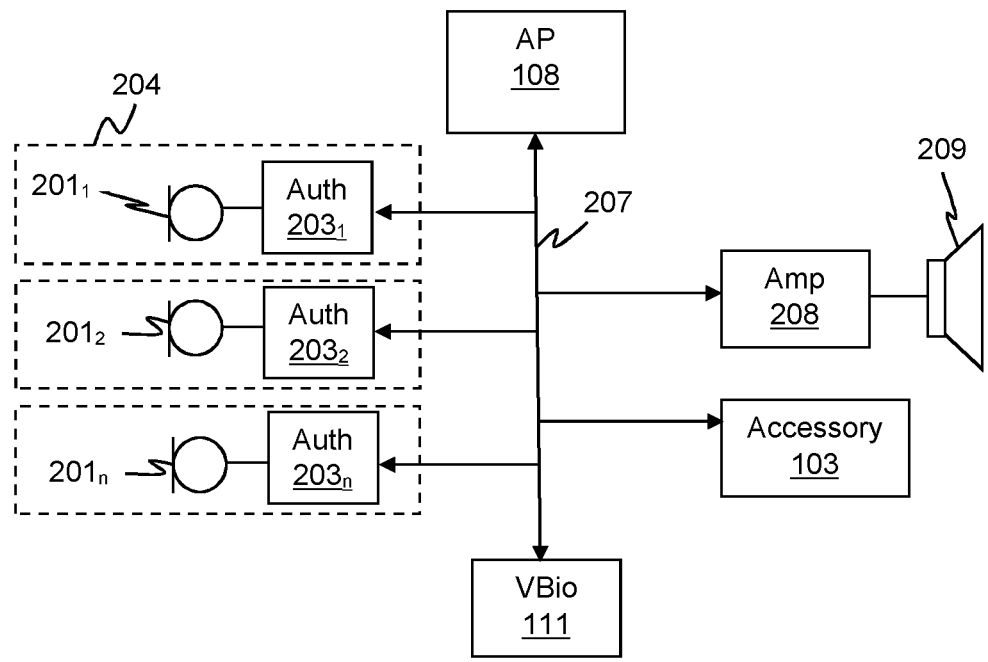

FIG. 2b illustrates a further example of a system in which data from a trusted domain 204, comprising a microphone 201 and data authentication module 203, may be directed to the AP 108 and/or a voice biometric authentication module 111 via a bus 207. The bus may additionally connect to other suitable components, such as an on-board amplifier 208 for a speaker 209 and/or transmit data to a suitable accessory 103 via a suitable interface (not shown). The bus may be a multi-channel bus suitable for transmitting multiple channels of data, for instance audio data $D_M$ in one channel and \ MAC in a suitable side channel or control channel. FIG. 2b also illustrates that in some instances there may be more than one microphone $201_{1-n}$ that may, in use, produce microphone audio data to be authenticated. In this example each microphone $201_{1-n}$ has an associated authentication module $203_{1-n}$ in an associated trusted domain. In this example the illustrated microphones can each provide microphone audio data to the same bus 207.

SoundWire™ is an example of a multi-drop data transfer protocol which allows for different data transport mechanisms or different channels of data, that would be suitable for interfacing a digital microphone with a system, such as illustrated in FIG. 2b. Using a protocol such as SoundWire™, each device connected to the bus 207 would be able to receive and modify data on the bus. In such an implementation authentication of the microphone audio data $D_M$ from a microphone 201 is advantageous. A multichannel protocol such as SoundWire™ would allow for the transfer of digital microphone audio data $D_M$, with MACs appropriate for the relevant audio data being transmitted via another suitable data transport mechanism, e.g. a control channel. The SoundWire™ specification provides for two control mechanisms, a low bit rate Register Access and a higher speed Bulk Register Access, as would be understood by one skilled in the art. The Bulk Register Access data transport mechanism would be suitable for transfer of the MAC with digital microphone audio data as the main data payload.

In all cases when voice authentication is required, the microphone audio data $D_M$, together with the signature or MAC, can be provided to the voice biometric authentication module 111.

It will be appreciated that as the signature or MAC corresponds to the digital microphone audio data $D_M$ as processed by the authentication module 203, any processing of this audio data by intermediate components in the signal path between the authentication module 203 of the trusted domain 204 and the voice biometric authentication module 111 in way that would alter the digital microphone audio data $D_M$, would mean that the MAC or signature would no longer correspond to the audio data as processed and the verification would thus indicate a negative result. In some embodiments therefore there may be a signal path that may be enabled for voice authentication/verification that has no processing applied to audio data received from a microphone and/or processing that may be applied in some use cases may be deactivated for a voice biometric verification use case. The digital microphone audio data $D_M$ may, of course, be processed as desired if voice biometric authentication is not required or may be processed downstream of the voice biometric authentication module 111, or in a parallel signal path.

A data verification module 205 of the voice biometric authentication module 111 will analyse the received audio data together with the signature/MAC. In some embodiments if microphone audio data is provided without an accompanying MAC the voice authentication will fail, i.e. the voice authentication result will be negative.

If microphone audio data, along with an accompanying MAC, is received by the voice biometric authentication module 111, the data verification module 205 will process the received data and the MAC to check whether the MAC is valid for the received data and the relevant trusted domain, for instance by using a public key for the trusted domain stored in a key memory 206 of the voice biometric authentication module 111.

If there is more than one trusted domain 204 that may transmit audio data that may be received by the voice biometric authentication module 111, for example as illustrated in FIG. 2b, each trusted domain may have an individual private key. In this case a corresponding public key for each trusted domain will be held by the voice biometric authentication module 111. The audio data received by the voice biometric authentication module 111 may include an indication of the relevant trusted domain that the audio data is supposed to originate from so the voice biometric authentication module 111 can select the appropriate public key for use. Alternatively the voice biometric authentication module 111 could process the MAC using all known public keys to determine which, if any, trusted domain authenticated the audio data. This would allow the voice biometric authentication module 111 to identify the source of the audio data, for instance to identify or verify that the audio data was received from a particular one of a plurality of digital microphones. The identity of the source may be useful in other functions implemented within device 100 or downstream, for instance in tailoring filter coefficients for frequency response equalisation or pre-emphasis or noise cancellation.

In some embodiments however, where multiple trusted domains are provided within an electronic device, each trusted domain may be provided with the same private key so that the voice biometric authentication module 111 (or other processing module wanting to authenticate the data) can use a single public key to determine that the audio data was authenticated in a trusted domain—without necessarily being concerned about which domain.

Where a data authentication module 203 of a trusted domain is part of the electronic device 100 itself, for instance within a digital microphone 101 of the electronic device 100 or part of a trusted domain of codec 107 of the electronic device, a first private key for the data authentication module 203 and a corresponding first public key for the data verification module 205 may be determined during device manufacture and stored in some suitable respective memory for the relevant module, such as a one-time programmable memory. In this way it can be assured that the voice biometric authentication module 111 has access to the first public key corresponding to the first private key of the data authentication module 203. In use the relevant keys may be replaced or refreshed by communication between the data authentication module 203 and data verification module 205 as will be described in more detail below. This means that the keys used to generate and verify the MAC change over time. In some embodiments however the first private and corresponding first public key may be used just for secure communication between the data verification module 205 and data authentication module 203 to allow communication of a different key to be used for signing the microphone data, which signing key may be updated in use.

Due to the nature of asymmetric key cryptography it doesn't matter if the public key is also known to the malware, as long as the private key used to authenticate the data is kept private. Thus a manufacturer of digital microphones with authentication according to an embodiment of the disclosure could store the first private key within the digital microphone and publish the corresponding first public key, e.g. on a data sheet or such like. A device manufacturer wishing to use such a digital microphone component could thus store the relevant public key in a secure memory accessible in a secure way by the voice biometric authentication module 111.

It is however necessary for the voice biometric authentication module 111 (or other processing module wishing to verify the audio data) to have knowledge of the public key of the trusted domain to be able to perform the verification or to securely transmit to the trusted domain as part of establishing a key set to be used for authenticating the microphone data.

If a trusted domain may be external to the electronic device 100, for instance if microphone 102 of accessory apparatus 103 were a digital microphone with a data authentication module, then the voice biometric authentication module 111 would need to know the public key for that external trusted domain.

In some instances the relevant public keys for likely external trusted domains that the electronic device may be expected to operate with may have been known at the time of device manufacture. The electronic device 100 may thus have been provided with at least one public key that corresponds to a private key that it was known is or will be used by manufacturers of an accessory apparatus. For example a particular manufacturer of an accessory such as a headset may have at least one predetermined private key that may be used for their products, with the same key being used for each product of a product line. The relevant public key or keys would be known to a device manufacturer and may be loaded into the electronic device 100 during device manufacture, for secure access by voice biometric authentication module 111 in use.

In use an accessory apparatus 103 using a private key corresponding to a public key preloaded for use by the voice biometric authentication module 111 may therefore be connected to the electronic device and used to provide authenticated microphone data, whether via a wired or wireless connection.

Were a new accessory apparatus 103 connected to the electronic device where a relevant public key was not known to the voice biometric authentication module 111 it would be necessary to relay the relevant public key to the voice biometric authentication module 111 in a way that could be trusted.

If the accessory apparatus 103 was aware of a public key for the voice biometric authentication module 111 (i.e. corresponding to a private key of the voice biometric authentication module 111) then this could be done cryptographically through a key exchange protocol. For example the accessory apparatus could transmit its own public key, along with a confirmation sequence, encrypted using the public key of the voice biometric authentication module 111. If this message gets to the voice biometric authentication module 111 without interference, it can decrypt the message, learn the public key and transmit the confirmation sequence back as confirmation. Audio data can then be signed as discussed previously. If malware intercepts the message it will be unable to decrypt the correct confirmation sequence, as it lacks the private key of the voice biometric authentication module 111, and thus will be unable to complete a handshaking process. The accessory apparatus may then be configured not to authenticate any audio data so it could not be used for voice authentication.

If the electronic device were to be used with an accessory apparatus having an authentication module 203 where neither the voice biometric authentication module 111 nor the authentication module 203 of the accessory apparatus were already in possession of a suitable key for the other module it would be necessary to transfer a key from one device to the other in a trusted way, for instance via reading a non-volatile memory in a way that could not be tampered with to read a stored public key or via a suitable key exchange protocol such as the known Diffie-Helman key exchange protocol.

Once the data verification module 205 is in possession of a relevant public key for a trusted domain 204 it may process the received audio data and MAC using the relevant public key. If the MAC is genuine the processing will confirm that the data was signed within the trusted domain 204, i.e. was signed using the private key of that trusted domain. It can thus be assumed that the audio data was genuinely produced by microphone transducer 201. If however there is a mismatch between the data and the MAC as processed by the data verification module 205 then the data verification module 205 may not confirm that the received audio data was generated within the trusted domain 204 and in some embodiments the voice authentication may thus indicate a negative authorisation result.

The MAC generated depends not only on the private key of the data authentication module 203 but also the data being authenticated itself. Thus if either the MAC or the data to which the MAC pertains is changed the verification will indicate a negative authorisation result.

Any malware operating on the AP 108 would not have access to the private key of the data authentication module 203 and would receive the microphone audio data after the MAC had been generated. If the malware simply removed the MAC then as discussed above the voice biometric authentication module 111 may be configured to reject data without a MAC and the voice authentication will not generate a positive result. If the malware changed or substituted the audio data and used the existing MAC, the data provided to the verification module 205 would no longer match the MAC. The verification module 205 would not verify the audio data and thus the voice authentication would provide a negative result. If the malware changed the audio data and attempted to generate its own MAC then, without knowing the relevant private key, it is overwhelming unlikely that the MAC would match when processed using the public key held by the voice biometric authentication module 111 and thus voice authentication would fail to generate a positive result. The embodiments described herein thus avoid a malware attack being applied in the signal path between the microphone and the verification module. In order to try an attack such a system with authenticated microphones an attacker would need to try to spoof the microphone itself with false data, i.e. previously recorded or synthesised speech data. This is both practically difficult and the time required to play the false audio means that the attack is not scalable in the way that a software attack is.

As mentioned above the relevant key set of private key and corresponding public key that is used for authenticating and verifying the microphone data may be changed in use according to a key refresh protocol. There are various ways that the keys may be refreshed, i.e. changed in use. For instance in one embodiment the voice biometric authentication module 111 may be configured to instigate a change of keys after a defined number of authentications of data from a given trusted domain, which could be after each authentication of a continuous stream of data. The key refresh could be accomplished in a similar manner to the key exchange discussed above, e.g. according to the Diffe-Helman protocol or some other suitable protocol.

Thus for instance consider that biometric authentication is required for a given speech input, say corresponding to a spoken phrase. The data authentication module 203 may use a first private key to authenticate the audio data, where the first private key has already been established as the then-current private key for that trusted domain and corresponds to a first public key held by or accessible to the data verification module 205. Once the authentication is completed the data verification module could indicate that a new key set should be used for data authentication for any subsequent biometric authentication attempt.

Additionally or alternatively a key refresh could be implemented in response to one or more instances of a voice trigger, e.g. a trigger phrase, being detected. As will be understood by one skilled in the art, an electronic device which may be voice controlled or activated may be configured such that the device, or applications running on the device, will only respond to spoken commands if preceded by a defined trigger phrase, for example a phrase such as "OK computer" or the like. This avoids the device responding incorrectly to utterances from a user which are not intended as voice commands for the device. In some instances a key refresh or key update may be commanded after every instance, or a certain number of instances, of a voice trigger being detected. The command to refresh or update the relevant keys may be provided from the voice biometric authentication module 111, or from another module, e.g. a speech recognition module 110 arranged to determine the content of the speech being spoken.

In some instances the data verification module could generate the new key set for that trusted domain, e.g. a second private key and corresponding second public key. The relevant newly generated second private key, or a suitable indicator of the new second key, such as a seed for a pseudo-random number generator for instance, could be securely communicated to the data authentication module 203. For example the second private key could be encrypted by the data verification module 205 using the existing first public key for the data authentication module 203. Only the data authentication module 203 will be able to correctly decrypt the new second key. The second private key could then be stored by the data authentication module 203 to be used as the relevant key set for data authentication for any subsequent biometric authentication attempt.

In some instances the data authentication module could generate the new key set and communicate the relevant public key to the data verification module 205. As the data authentication module retains the private key and only the public key is being transmitted there would then be no need for encryption of the public key as such—but there should be some process by which the data verification module 205 securely confirms that it has received the correct public key (and not a substitute generated by some malware as part of a so-called man-in-the-middle type attack). In some embodiments the data authentication module could sign the second public key itself with a MAC for the second public key—with the MAC being generated using the first private key. Only if the data verification module confirms the received public key as being data correctly received from the trusted domain will it update the public key it uses.

The data authentication module could thus generate a new key set periodically, for instance after an existing private key has been used for a certain number of data authentications and/or for a certain period of time, and/or a new private key could be generated in response to a request from the verification module for a key change. In any event the corresponding public key could then be communicated to the data verification module.

In some embodiments the data authentication module 203 and data verification module 205 may be arranged to agree on an appropriate key set for data authentication before any data authentication attempt.

Changing the key set used for data authentication periodically avoids the risk of a recording of audio data and a genuine historic MAC for that audio data being used to defeat the data authentication for a false biometric authentication attempt. For instance, malware could attempt to record audio data from a microphone that corresponded to a genuine user and also record the relevant MAC that was used to authenticate the data and later replay the audio data with the recorded MAC in an attempt to defeat the voice biometric authentication. As an example consider a user were prompted, as part of a verification process, to utter a defined pass-phrase. The audio data corresponding to the user uttering the selected pass-phrase would be provided to the voice biometric authentication module 111 along with an appropriate MAC that verifies the data was received from the trusted domain. Malware could record the data together with the MAC and, at some time later, try to obtain unauthorised access to some service. If the same pass phrase were selected for the user to utter in order to authorise the transaction, the malware could replay the recorded data along with the MAC that was valid at the time. If the authentication keys were not changed the voice biometric authentication module 111 could incorrectly verify the data. However if the authentication keys had been changed since the previous verification then the MAC would no longer be recognised as being valid and verification would be denied.

To allow for such a key refresh the data authentication module 203 may thus be configured to be able to undergo two way communication with the data verification module 205. For example the multi-drop bus arrangement illustrated in FIG. 2b allows an authentication module 203 to send and receive data via the data bus 207. However other arrangements are possible and in some instances a trusted domain may use one interface for data transmission and may receive control data, e.g. for key refresh, via a different interface.

Figure 3:
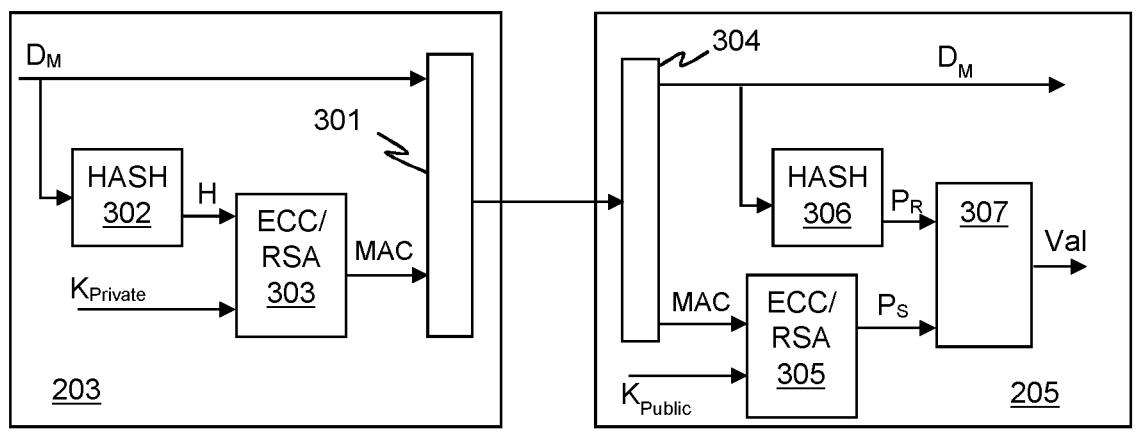
FIG. 3 illustrates one example of suitable authentication and verification modules.

FIG. 3 illustrates one example of how a suitable MAC may be generated and verified by a data authentication module 203 and data verification module 205. Digital audio data $D_M$ from the microphone is received and passed to an encoder 301. The digital microphone data $D_M$ is also passed to a hash module 302 which performs a hash of the data in appropriate frames. The hash module 302 may determine a hash value, H, for example according to the known SHA-256 algorithm as will be understood by skilled in the art, although other hash functions may also be appropriate. This hash value may be digitally signed using a signing module 303. The signing module may apply a known cryptographic signing protocol, e.g. based on the RSA algorithm or Elliptic-curve-cryptography (ECC) using the private key, $K_{private}$, known to the authentication module 203.

In one example a 256 bit hash value, H, is calculated by hash module 302 and the signing module pads this value to a higher bit hash, for instance a 2048 bit padded hash, P, as would be understood by one skilled in the art. Using the private key, $K_{private}$ (d,N) the Message Authentication Certificate (MAC), e.g. a 2048-bit MAC, is generated using modular exponentiation, e.g. the MAC is generated by raising P to power of d modulo N:

$$MAC = P^d \bmod N$$

In one example the exponent d is a 32-bit word and the modulus N is a 2048-bit word.

The encoder 301 receives the MAC and the data $D_M$ and encodes the data for transmission to other parts of the electronic device 100. In some instances the MAC may be simply added to the digital audio data $D_M$ to be transmitted in a predefined way, e.g. as the first or last 2048 bits defined with respect to some frame boundary. In some instances if audio data is to be transmitted via a protocol such as Soundwire™ that allows for multiple channels of data to be transmitted the MAC could be sent via an appropriate side channel.

For voice authentication the data may be provided to the voice biometric authentication module 111 where it may be received by the verification module 205. A decoder 304 may extract the audio data $D_M$ and the MAC. The MAC may be passed to cryptographic module 305 where, using the public key $K_{Public}$ (e, N) and the corresponding RSA or ECC algorithm the value of the signed padded hash value $P_S$ may be extracted by raising the MAC to the power of e modulo N. The full domain hash may thus be calculated as:

$$P_S = MAC^e \bmod N$$

The extracted data $D_M$ is also passed to hash module 306 that performs the same hash and padding process as was applied by the data authentication module, to determine a padded hash value $P_R$ for the received audio data $D_M$. The two padded hash values $P_S$ and $P_R$ may be compared by comparator 307 and a data validity signal generated indicating that the data is valid, if the two padded hash values or the same, or that the data is invalid, if the values differ.

The description above of the algorithms used and the various bit lengths is by way of example only and different algorithms and/or bit lengths may be used depending on the application. In some instances padding of the hash value may not be required. It will be understood that the discussion above has focused on asymmetric key based signing, i.e. the use of public and private keys. However the signing could additionally or alternatively involve some symmetric signing, e.g. based on a mutually shared secret or the like.

It will be appreciated that performing the hash and generating the appropriate MAC in the data authentication module 203 will take some processing time. In some embodiments the audio data $D_M$ may be delayed by a suitable buffer, e.g. as part of encoder 301, before transmission, so that a MAC may be transmitted as part of a frame of data including at least some of the audio data to which it relates. In other embodiments the microphone audio data $D_M$ may be transmitted from the data authentication module 203 without any such deliberately introduced delay and the MAC sent later, either after some predetermined delay and/or together with some information that allows the relevant MAC to be paired with the relevant audio data. It is noted that processing of the audio data $D_M$ for voice biometric authentication, i.e. speaker recognition, does not itself require the MAC. The MAC allows a separate verification, by the data verification module 205, that the relevant audio data originated from the microphone, and thus provides a means of authenticating that the audio data used for speaker recognition is valid and thus that the result of voice biometric authentication can be taken as valid. Processing the audio data for voice biometric authentication will take some processing time and thus audio data may, in some instance, be provided to the voice biometric authentication module 111 to generate a speaker recognition result. By the time the result of voice biometric authentication is available the relevant MAC may be been received and used to verify or not the audio data.

As mentioned the encoder 301 may encode the digital microphone data $D_M$ with the MAC in a number of different ways, for instance by interspersing the MAC with the audio data $D_M$ in some defined way or otherwise sending via some suitable side channel.

In some embodiments the data transmitted by encoder 301 be coded or recoded as a PDM (pulse density modulation) data stream or other time-based encoding stream. Especially where the trusted domain is within a digital microphone package and thus the encoder 301 is an encoder of a digital microphone the use of PDM data streams may be commonly be used for transfer of audio data. In such embodiments the MAC may be derived based on the microphone signal in the audio frequency band.

As noted above however it can be beneficial to change the keys used for authentication periodically, e.g. after defined intervals or after one or more authentications and/or after one or more instances of detection of a voice trigger. The keys to be used could be generated by the authentication module and the public key communicated to the verification module using the same encoding scheme as used for encoding the MAC. In some embodiments the data authentication module 203 could decide when to change the key set and thus the communication from the trusted domain 204, which could for instance be a packaged microphone, may be one-way. The newly generated public key to be transmitted could be sent with an appropriate MAC for the public key, thus allowing the data verification module 205 to verify that the public key was received from the trusted domain.

As noted above however to securely engage in a key refresh protocol it may be advantageous to allow for two-way communication between the data authentication module 203 and the data verification module 205. In some embodiments some limited communication between a packaged microphone and other components of a host device may be achieved by modulation of one of the inputs supplied to the packaged microphone. For instance modulation of a supply voltage supplied to the microphone package could be used to communicate at least some information to the packaged microphone. In some embodiments the data verification module 205 may therefore be able to request a new key set by generating a control signal for controlling a defined modulation of the supply voltage $V_{supply}$ which is supplied to the trusted domain 204. In response to detection of the defined modulation of the supply voltage the data authentication module 203 may generate a new public key which may be transmitted to the data verification module 205 by high frequency tone PSK encoding as described above. The public key could be signed with a MAC using the existing private key and the verification module may provide a short coded response to confirm that the new public key is received and verified and will be used thereafter.

Generating a MAC as described in the examples above thus allows a portion of audio data to be certified in a way that allows any changes in the audio data to be detected. This provide certainty that the received audio data corresponds exactly to the audio data produced within the trusted domain in which the audio data was certified. However, as noted above, this does generally mean that the audio data cannot be processed in any way that may result in a change in the audio data.

In some instances it may be desired to process the audio data in some way before being transmitted and/or after being received. In particular, in some embodiments it may be advantageous to perform some processing operation, e.g. an operation such as compression, feature extraction etc. prior to sending the microphone data to reduce the amount of data to be transmitted.

It would be possible to apply some signal processing function to the audio data $D_M$, e.g. to reduce data content, and then generate a MAC on the processed audio data. An appropriate data verification module could then verify that the processed data was valid. However the processed audio data may not be suitable for voice biometric authentication purposes and it may be necessary to process the received data to generate a restored audio data stream, e.g. to effectively reverse a lossy operation such as compression applied prior to sending, in order to apply voice biometric authentication. In some instances it may not be appropriate or desirable for the voice biometric authentication module itself to restore the processed data and such a module may therefore receive and process the restored data stream. It would therefore be advantageous to authenticate that the restored data stream does correspond to the original audio data. It will be appreciated however that, in practice, there will be at least some differences between the original audio data and such a restored data stream due to inevitable losses in the conversion process. Were a MAC to be generated based on the original audio data before the lossy operation were applied it is very likely that the relevant MAC would not match the restored audio data and there would be a mismatch between the MAC generated and tested against.

In general therefore in some embodiments it may be known that some signal processing will be applied, downstream, to the microphone audio data which is transmitted from the authentication module. If the relevant signal processing function is known then the same processing may be applied to the digital microphone data in the authentication module before generating the MAC. In this way the MAC generated will correspond to the data which is generated after the downstream processing.

Figure 4:
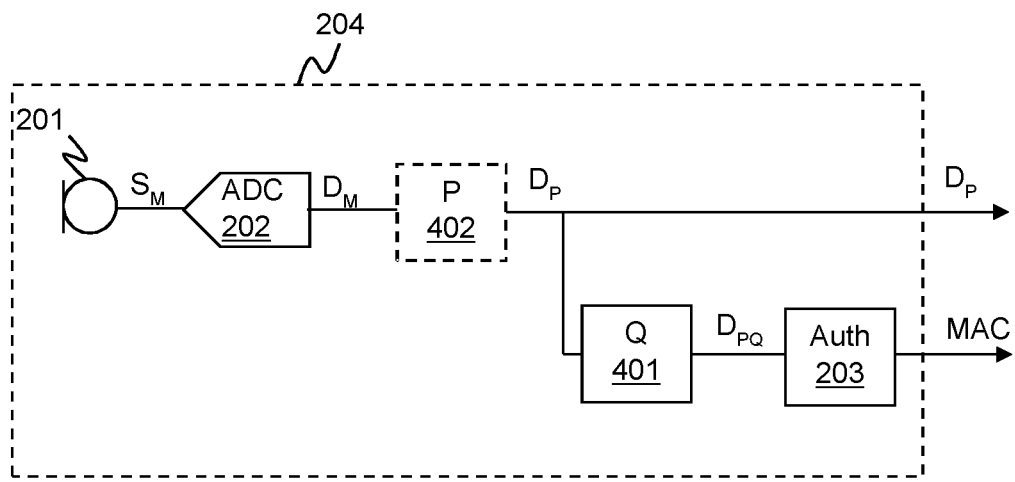
FIG. 4 illustrates another example of authentication transmission of audio data.

FIG. 4 shows a transmission scheme with a first signal processing module 401 for processing the digital microphone data to apply some function Q to the data before it is passed to the authentication module to generate the MAC. The first function Q is a function which is known to correspond to a function that will be applied, downstream, to the data which is transmitted from the trusted domain before verification.

As noted above this could be the case where it is wished to apply some signal processing to the microphone data to be transmitted to reduce the data content, i.e. to apply some lossy encoding to reduce the data bandwidth required. Thus in some embodiments there may be a second signal processing module 402 to apply some second function P to the microphone data $D_M$ to produce a processed version of the data $D_P$ for transmission. The second function may apply some lossy coding operation P, e.g. such as compression, to the audio data $D_M$ in the transmission path to provide processed audio data $D_P$ for transmission. Thus the second signal processing module 402 may be a lossy coder. The microphone data $D_P$ which is output from the second signal processing module is passed to the first signal processing module 401 which applies the first function Q, which may for instance be a known restoring function such as a decompression function. Thus, to avoid a MAC error due to the lossy nature of the coder 402, the MAC is not calculated on the original audio data $D_M$ or the processed version $D_P$ but is instead calculated on a restored, e.g. compressed and then decompressed version $D_{PQ}$. The microphone data $D_{PQ}$ processed by both the second and first signal processing modules is thus passed to the authentication module to generate the MAC. The processed data $D_P$ may be transmitted alongside the MAC.

It should be noted that is not necessary that function Q provide an exact restoration of the original signal $D_M$, i.e. functions P and Q do not need to be exact inverses and P*Q does not need to equal one. It will also be appreciated that the general principles apply to any function Q whether or not any function P is applied and that one or both of functions P and Q may be a compound function which, in practice, may be applied separately by different modules.

Figure 5:
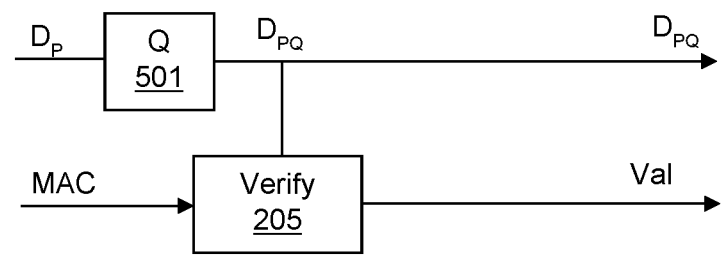
FIG. 5 illustrates an example of verification of audio data transmitted by the apparatus of FIG. 4.

FIG. 5 shows the MAC verification process where the received data $D_P$ is passed via a third signal processing module 501 to apply known function Q, e.g. a function that reconstructs a data stream $D_{PQ}$ that matches the verified data. The reconstructed data $D_{PQ}$ is passed to the data verification module 205 along with the MAC, which is used to verify that the restored data $D_{PQ}$ corresponds to data which results in applying P and Q to the original audio data $D_M$.

In general therefore embodiments of the present disclosure relate to electronic devices which have a trusted domain for receiving or generating digital audio data corresponding to sounds detected by a microphone transducer and an authentication module within the trusted domain for authenticating the audio data such that a processing module can verify whether audio data received was authenticated within the trusted domain. In some embodiments the trusted domain may comprise a microphone component, e.g. a packaged digital microphone unit. Embodiments thus relate to digital microphone circuits that authenticate, i.e. sign or certify, digital data output from the digital microphone circuit. In some embodiments the trusted domain may comprise an audio circuit, such as an audio codec, which is not integrated with or packaged with the microphone transducer whose data is to be authenticated but which, in use, is coupled to receive data from the microphone transducer. The audio circuit of the trusted domain, e.g. the codec, may, in use, be connected to receive audio data from the microphone transducer via a trusted signal path which may comprise a wired signal path. The wired signal path may be via a suitable connector of the host device comprising the trusted domain.

Authentication of the audio data from a microphone transducer may be useful for a variety of applications. In particular authentication of the audio data may be useful for voice based biometric user authentication. A processing module receiving the authenticated audio data may therefore comprise a voice biometric authentication module. Embodiments thus also relate to a voice biometric authentication module having a data verification module for verifying that audio data received was authenticated in a trusted domain as corresponding to audio signals received from a microphone transducer.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile telephone, an audio player, a video player, a PDA, a mobile computing platform such as a laptop computer or tablet and/or a games device for example.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. An audio system comprising:
    a microphone authentication apparatus, the microphone authentication apparatus comprising:
        a first input for receiving analogue audio signals from a microphone transducer;
        an analogue-to-digital converter coupled to said first input for generating digital microphone data based on the received audio signals;
        a data authentication module for generating an authentication certificate for certifying that the digital microphone data did pass via the authentication module, wherein the data authentication module generates the authentication certificate based on the digital microphone data and an authentication module key; and
        an output module for outputting a digital microphone audio signal based on the digital microphone data with the authentication certificate;
    the audio system further comprising:
    a first data processing module for receiving input digital data, wherein said first data processing module may be configured to receive a digital microphone audio signal;
    wherein the first data processing module is a voice biometric user authentication module for verifying whether the received digital microphone data corresponds to the voice of a registered user; and
    wherein said first data processing module comprises a data verification module for verifying whether the digital microphone audio signal comprises digital audio data with an accompanying authentication certificate that indicates that the received digital microphone data was authenticated by said data authentication module;
    wherein the microphone authentication apparatus comprises a first signal processing module for applying a compression function and a second signal processing module for applying a decompression function, wherein the first signal processing module is configured to process the digital microphone data to generate first processed digital microphone data and the second processing module is configured to process the first processed digital microphone data to generate second processed digital microphone data, wherein the data authentication module is configured to generate the authentication certificate based on the second processed digital microphone data having been processed by both the first signal processing module and then the second signal processing module, and wherein the output module outputs the first processed digital microphone data as the digital microphone audio signal.

2. The audio system as claimed in claim 1 wherein the voice biometric user authentication module is configured to not verify the received digital microphone data as corresponding to the voice of a registered user if the received digital microphone data is not verified as having been authenticated by said data authentication module.

3. The audio system as claimed in claim 1 comprising a microphone transducer coupled to said first input for generating said analogue audio signals.

4. The audio system as claimed in claim 3 wherein the microphone transducer, analogue-to-digital converter and data authentication module are formed within a digital microphone package.

5. The audio system as claimed in claim 3 wherein the microphone transducer, analogue-to-digital converter and data authentication module are formed as an integrated circuit.

6. The audio system as claimed in claim 1 wherein the data authentication module comprises a hash module for performing a hash algorithm on the digital microphone data and a signing module for signing a hash value derived from the hash algorithm using the authentication module key.

7. The audio system as claimed in claim 6 wherein the data authentication module is configured to derive an initial hash value from the hash algorithm and to pad said initial hash value to generate a padded hash value, wherein the signing module signs the padded hash value.

8. The audio system as claimed in claim 1 wherein the output module comprises a data encoder for encoding the digital microphone data in the digital microphone audio signal with the authentication certificate.

9. The audio system as claimed in claim 8 wherein the data encoder outputs the authentication certificate in a predefined bit arrangement with respect to the digital audio data or via a side channel or data transport mechanism of a digital data transfer protocol.

10. The audio system as claimed in claim 1 wherein the first data processing module comprises a third signal processing module configured to apply said first function to the received digital microphone data and wherein the data verification module receives data output from said third signal processing module.

11. The audio system as claimed in claim 1 wherein the data verification module is configured to verify whether an authentication certificate accompanying digital audio data is valid using a verification module key corresponding to the authentication module key and the system is configured to update the authentication module key and corresponding verification module key over time.

12. The audio system as claimed in claim 11 wherein the audio system is configured to update the authentication module key and corresponding verification module key in response to at least one of: a defined number of one or more authentications of data; one or more instances of a voice trigger command being detected; and a key change command generated at periodic intervals.

13. The audio system as claimed in claim 1 wherein the data verification module comprises:
 a hash module for performing a hash algorithm on the received digital microphone data;
 a cryptographic module for processing a received authentication certificate using a verification module key; and
 a comparator for comparing a hash value derived from the hash algorithm with a signed hash value derived from the cryptographic module.

14. The audio system as claimed in claim 1 comprising a data decoder for receiving the input digital microphone audio signal and separately outputting the received digital audio data and the authentication certificate.

15. The audio system as claimed in claim 1 comprising a plurality of authentication modules, each authentication module associated with at least one microphone, wherein the verification module is configured to identify which of said plurality of authentication modules authenticated the received digital microphone data.

16. The audio system as claimed in claim 15 further comprising a controller configured to select one of a plurality of signal processing settings for controlling signal processing to be applied to the received digital microphone data based on the identity of which of said plurality of authentication modules authenticated the received digital microphone data.

17. A microphone authentication apparatus for use in the audio system of claim 1 comprising:
 a first input for receiving analogue audio signals from a microphone transducer;
 an analogue-to-digital converter coupled to said first input for generating digital microphone data based on the received audio signals;
 a data authentication module for generating an authentication certificate for certifying that the digital microphone data did pass via the authentication module, wherein the data authentication module generates the authentication certificate based on the digital microphone data and an authentication module key; and
 an output module for outputting a digital microphone audio signal based on the digital microphone data with the authentication certificate;
 wherein the microphone authentication apparatus comprises a first signal processing module for applying a compression function and a second signal processing module for applying a decompression function, wherein the first signal processing module is configured to process the digital microphone data to generate first processed digital microphone data and the second processing module is configured to process the first processed digital microphone data to generate second processed digital microphone data, wherein the data authentication module is configured to generate the authentication certificate based on the second processed digital microphone data having been processed by both the first signal processing module and then the second signal processing module, and wherein the output module outputs the first processed digital microphone data as the digital microphone audio signal.

18. An electronic device comprising:
 a microphone;
 a voice biometric authentication module for verifying whether or not a user is a registered user by analysing voice audio data; and
 an authentication module in a signal path between the microphone and the voice biometric authentication module for generating an authentication certificate for audio data received from the microphone;
 wherein the authentication module is configured to process the audio data received from the microphone by applying a compression function followed by a decompression function prior to generating the authentication certificate.

* * * * *

UNITED STATES PATENT AND TRADEMARK OFFICE
CERTIFICATE OF CORRECTION

PATENT NO. : 11,271,756 B2
APPLICATION NO. : 16/607539
DATED : March 8, 2022
INVENTOR(S) : John Paul Lesso It is certified that error appears in the above-identified patent and that said Letters Patent is hereby corrected as shown below:

In the Claims

1. In Column 22, Line 10, in Claim 1, delete "a digital microphone audio signal" and insert -- the digital microphone audio signal --, therefor.

2. In Column 22, Line 14, in Claim 1, delete "user; and" and insert -- user; --, therefor.

3. In Column 22, Line 21, in Claim 1, delete "module;" and insert -- module; and --, therefor.

4. In Column 23, Lines 15-16, in Claim 11, delete "an authentication certificate" and insert -- the authentication certificate --, therefor.

Signed and Sealed this
Eighteenth Day of October, 2022

Katherine Kelly Vidal
*Director of the United States Patent and Trademark Office*